US 7,604,002 B2

(12) United States Patent
Rabas et al.

(10) Patent No.: US 7,604,002 B2
(45) Date of Patent: Oct. 20, 2009

(54) OVEN WITH ADJUSTABLE PAN SUPPORTS AND REMOVABLE OVEN RACK

(75) Inventors: Jiri Rabas, South Burlington, VT (US); Kevin L. Griswold, Williston, VT (US); Daniel J. Swayze, Colchester, VT (US)

(73) Assignee: G.S. Blodgett Corporation, Burlington, VT (US)

( * ) Notice: Subject to any disclaimer, the term of this patent is extended or adjusted under 35 U.S.C. 154(b) by 708 days.

(21) Appl. No.: 11/270,173

(22) Filed: Nov. 9, 2005

(65) Prior Publication Data

US 2006/0102017 A1    May 18, 2006

Related U.S. Application Data

(60) Provisional application No. 60/627,295, filed on Nov. 12, 2004.

(51) Int. Cl.
*F24C 15/16*    (2006.01)

(52) U.S. Cl. .................. 126/337 R; 126/332; 126/339; 126/337 A; 126/334; 126/333

(58) Field of Classification Search ................ 49/194, 49/463, 464; 248/317; 312/351.5; 211/126.2; 126/337 R, 338, 337 A, 333, 334, 339, 332
See application file for complete search history.

(56) References Cited

U.S. PATENT DOCUMENTS

| 2,840,013 | A | * | 6/1958 | Seils ......................... 403/263 |
| 2,883,253 | A | * | 4/1959 | Litman ....................... 312/237 |
| 2,913,213 | A | * | 11/1959 | Folker ........................ 248/265 |
| 3,443,851 | A | * | 5/1969 | Earl ........................... 312/245 |
| 3,537,405 | A | * | 11/1970 | Verhoeven ................... 426/523 |
| 3,595,178 | A | * | 7/1971 | Dahlen ........................ 432/241 |
| 3,618,511 | A | * | 11/1971 | Matthews ..................... 100/194 |
| 3,698,780 | A | * | 10/1972 | Collins et al. ................ 312/245 |
| 3,954,053 | A | * | 5/1976 | Johansson et al. ........... 99/443 R |
| 4,103,983 | A | * | 8/1978 | Morrison et al. ............. 439/298 |
| 4,140,355 | A | * | 2/1979 | Swain ....................... 312/330.1 |
| 4,202,259 | A | * | 5/1980 | Johansson ..................... 99/352 |
| 4,285,391 | A | * | 8/1981 | Bourner ....................... 165/61 |

(Continued)

FOREIGN PATENT DOCUMENTS

EP          0 112 786 A1    7/1984

(Continued)

*Primary Examiner*—Kenneth B Rinehart
*Assistant Examiner*—Jorge Pereiro
(74) *Attorney, Agent, or Firm*—Brinks Hofer Gilson & Lione (57) ABSTRACT

A baking apparatus with a removable rack and adjustable pan supports provides the user with versatility by permitting manual re-configuration of the spacing of the oven racks as desired by the user. The removable rack component includes two interfaces for the oven, a locking rib on the top and a fastener or plunger on the bottom. These permit the user to manually remove the rack from the oven without using tools or other apparatus. The adjustable pan supports include offset tabs for removably and easily engaging the oven rack. The pan supports are removed and repositioned, adjusting shelf height and distance, by lifting and turning the pan supports 90 degrees to release the supports from the rack slot, removing the supports, and repositioning them as desired.

13 Claims, 6 Drawing Sheets

U.S. PATENT DOCUMENTS

| | | | | |
|---|---|---|---|---|
| 4,375,354 A | * | 3/1983 | Henriksson | 432/239 |
| 4,450,961 A | * | 5/1984 | Bies et al. | 206/349 |
| 4,580,853 A | * | 4/1986 | Hitzeroth et al. | 312/245 |
| 4,628,185 A | * | 12/1986 | Norwood et al. | 219/386 |
| 4,727,598 A | * | 2/1988 | Ehlers | 455/347 |
| 4,746,291 A | * | 5/1988 | Cistero | 432/241 |
| 4,753,406 A | * | 6/1988 | Kodama et al. | 248/327 |
| 4,785,151 A | * | 11/1988 | Voegtlin | 219/400 |
| 5,009,384 A | * | 4/1991 | Gerke et al. | 248/343 |
| 5,655,672 A | * | 8/1997 | Stuchlik, III | 211/70.7 |
| 5,953,999 A | * | 9/1999 | Kanehl | 108/44 |
| 5,957,309 A | * | 9/1999 | Hall | 211/126.2 |
| 6,098,944 A | * | 8/2000 | Pangborn et al. | 248/317 |
| 6,131,507 A | * | 10/2000 | Westbergh | 99/427 |
| 2002/0100739 A1 | * | 8/2002 | Day et al. | 211/126.2 |
| 2003/0173320 A1 | * | 9/2003 | Linney et al. | 211/126.2 |
| 2003/0196975 A1 | * | 10/2003 | Murray et al. | 211/126.2 |
| 2005/0051149 A1 | * | 3/2005 | Bock | 126/19 R |

FOREIGN PATENT DOCUMENTS

| | | | | |
|---|---|---|---|---|
| FR | 2467548 A | * | 5/1981 | |
| FR | 2536734 A | * | 6/1984 | |
| FR | 2734537 A1 | * | 11/1996 | |
| GB | 2113063 A | * | 8/1983 | |

* cited by examiner

OVEN WITH ADJUSTABLE PAN SUPPORTS AND REMOVABLE OVEN RACK

This application claims the benefit of the filing date under 35 U.S.C. § 119(e) of Provisional U.S. Patent Application Ser. No. 60/627,295, filed on Nov. 12, 2004, which is hereby incorporated by reference in its entirety.

BACKGROUND

The present invention relates generally to an apparatus for baking, and in particular to a removable oven rack and adjustable pan components of the baking oven.

Baking ovens can be used for preparing a variety of food items. In addition, baking ovens can have many different features to enhance the baking experience of the user as well as accommodate different baking needs. For instance, a baking oven can be used to prepare large food items such as a roasted turkey or a small delicate food item such as soufflé.

In most instances, the baking experience is quite successful and all of the food items are contained in the preparation dishes. However, over time, food particles that spill over or escape the preparation dishes may adhere to the interior surface of the baking oven. Eventually, the user will need to clean the baking oven to remove the stains and spills from the interior surface not only for sanitary reasons but also because the residue may adversely affect the overall taste of subsequent food items prepared in the baking oven.

Hence, the cleaning of the baking oven typically can be a very time-intensive process because of the size and arrangement of the interior components of the baking oven. For instance, commercially available ovens include an oven rack that is either welded or permanently affixed to the oven shaft. As a consequence, the rack can only be removed by contacting a service technician having special tools to disassemble the rack. In some cases, a partial disassembly of the oven rack is required to remove it from the interior of the baking oven. Once the rack has been disengaged, it can subsequently be cleaned. The duration of this process varies. The additional labor required to disassemble and reassemble the oven rack components is undesirable, and there is an increased possibility that the oven rack components could be damaged or broken each time the oven rack has to be removed. Additionally, each time the oven needs to be cleaned, a service technician has to be contacted and scheduled. Hence, there may be times when the service technician is unavailable because of time restraints. The user then has a dilemma of whether to continue to use the baking oven or to incur significant delays in its operation until the baking oven can be cleaned.

In addition to problems associated with removing the oven rack, there are also other challenges associated with the pan support configuration within the oven rack. Typically, pan supports are installed in a set configuration and do not permit manual repositioning or reconfiguration by the user in either the longitudinal or lateral direction. The pan supports are permanently affixed to the rack either through welding or an equivalent process.

With the present systems, oven operators need to purchase and store oven racks with different support pan spacing to accommodate different heights needed for specific baking and cooking operations. In addition, the pan support member is fixed to the rack through welding or equivalent methods. Therefore, to change the spacing increments, a different rack is needed.

It would be desirable to have the pan support spaces at different increments to provide greater flexibility in the baking process as well being able to remove the pan support for cleaning purposes. Currently, pan supports do not provide any manual adjustment in the configuration and if any changes need to be made to the configuration, a new or different rack must be installed to accommodate the change. Thus, oven operators may need to store oven racks with different pan supports having a variety of space configurations.

It would also be desirable to have a pan support assembly that could be easily replaced in the event of minor damage or if needed to be replaced. Currently, if a pan support becomes damaged, the entire configuration must be replaced and there is limited space to store extra rack variations in the event that a quick replacement is needed.

Therefore, there is a need for a baking oven having removable oven racks that can be manually removed by the user without the use of complex tools or specialized experience, allowing the user to clean the oven racks outside of the oven. In addition, there is also a need for a pan support that can be easily replaced and eliminate the need for multiple racks to be purchased and stored by the user.

BRIEF SUMMARY

Embodiments of the present invention are directed to apparatuses for baking, the apparatus including a removable oven rack and adjustable pan support. One embodiment is an oven having an insulated housing, a shaft and a top housing interface fixed to an inner top portion of the insulated housing, and a rack for holding a plurality of pans for use inside the oven, the rack including a top rack interface for removably securing the rack to the top housing interface, wherein the rack is removable without tools from the housing. The removable rack can be extracted from the interior of the oven without the use of tools or special expertise.

Another embodiment is a rack for use within the oven. The rack includes a plurality of vertical supports and a plurality of slots within the vertical supports, at least a portion of which slots are vertically aligned, for removable placement of pan supports in the slots. The rack also includes a plurality of horizontal supports connected to the vertical supports, and a top and a bottom cross-member, the cross-members connected to the horizontal supports, wherein the pan supports are movable without tools from a first vertically aligned position to a second vertically aligned position Another embodiment is an oven. The oven includes a housing and a rack for use inside the housing, the rack including vertical supports, a plurality of slots within the supports, at least a portion of which slots are vertically aligned, for removable placement of pan supports in said slots, wherein the pan supports are movable without tools from a first vertically aligned position to a second vertically aligned position.

Another embodiment is a pan support. The pan support includes a horizontal portion of metal, a vertical portion of metal forming a continuum with and substantially equal in length to the horizontal portion of metal, the horizontal and vertical portions joined at a substantially 90° angle. The pan support also includes at least two supporting tabs on opposite ends of the vertical portion, each supporting tab comprising a first portion bent at about a 90° angle, a second portion bent at about a 90° angle, and a third portion substantially parallel to the vertical portion.

Another aspect is an oven. The oven includes an insulated housing, a shaft fixed to the housing, a plate fixed to the shaft, the plate further including two ribs, and a rack for use inside the housing, the rack including at least two slots for interfacing with the plate and for removably securing the rack to the plate, wherein the rack is removable from the housing without tools.

Another aspect is an oven. The oven includes a housing and a rack for use inside the housing, wherein the rack includes vertical supports, a plurality of slots within the supports, at least a portion of which slots are vertically aligned, for removable placement of pan supports in said slots, wherein said pan supports are movable from a first vertically aligned position to a second vertically aligned position without tools, and at least one interface for removably securing the rack inside the housing, wherein the rack is removable from the housing without tools.

There are many other aspects and embodiments of the invention, of which the following drawings and description are meant to be illustrative rather than limiting.

BRIEF DESCRIPTION OF THE DRAWINGS

These and other features and advantages of the present invention will be better understood by reference to the following detailed description when considered in conjunction with the accompanying drawings, wherein.

DETAILED DESCRIPTION OF THE DRAWINGS AND THE PRESENTLY PREFERRED EMBODIMENTS

Turning now to the figures, reference numerals are used to designate corresponding elements in the figures. Although the present invention has been described with reference to preferred embodiments, those skilled in the art will recognize that changes may be made in form and detail without departing from the spirit and scope of the invention. As such, it is intended that the following detailed description be regarded as illustrative rather than limiting and that it is the appended claims, including all equivalents thereof, which are intended to define the scope of the invention.

Figure 1:
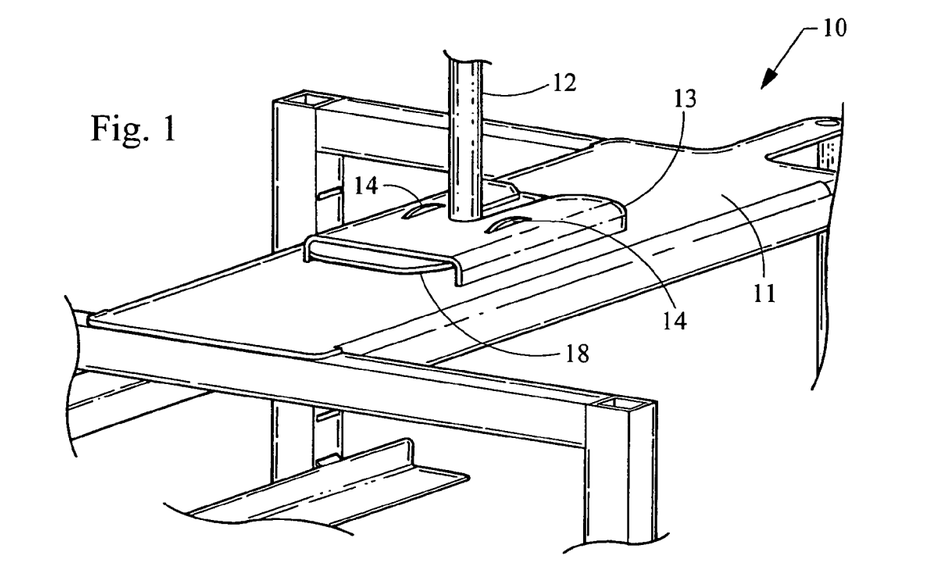
FIG. 1 is a perspective top view of a removable oven rack.

Several embodiments of baking oven components constructed in accordance with the present invention are shown in FIGS. 1-8. Referring to the figures, FIG. 1 shows a removable oven rack 10 in accordance with the aspects of the present invention. The rack 10 comprises a top cross member 11 and a bottom cross member 15 (shown in FIG. 5A). There is a hat section 13 attached to the top cross member 11. A hat-section is a plate that is joined to a surface on the sides of the plate but is free in the middle portion and at least one end, so that at least a thin object may be inserted between the hat section and the surface. In this case, the surface is the top surface of cross-member 11.

Hat section 13 includes a gap between the top of the hat section and the surface so that plate 18 may be readily and removably inserted, and thus so that rack 10 may be quickly and easily suspended from plate 18 and so that rack 10 may be quickly and easily placed into the oven and removed from the oven. Hat section 13 is preferably welded or otherwise attached permanently attached to cross-member 11, the attachment being sufficiently strong to support the weight of rack 11, a plurality of pans, as will be discussed below, and any articles or goods for baking that will be placed on the pans during their time in the oven. Attached to the oven is a shaft 12 including a plate 18 welded to shaft 12. The plate 18 has at least two locking ribs 14. Shaft 12, best shown in FIG. 5B discussed below, is secured to the inside of the oven.

Figure 2:
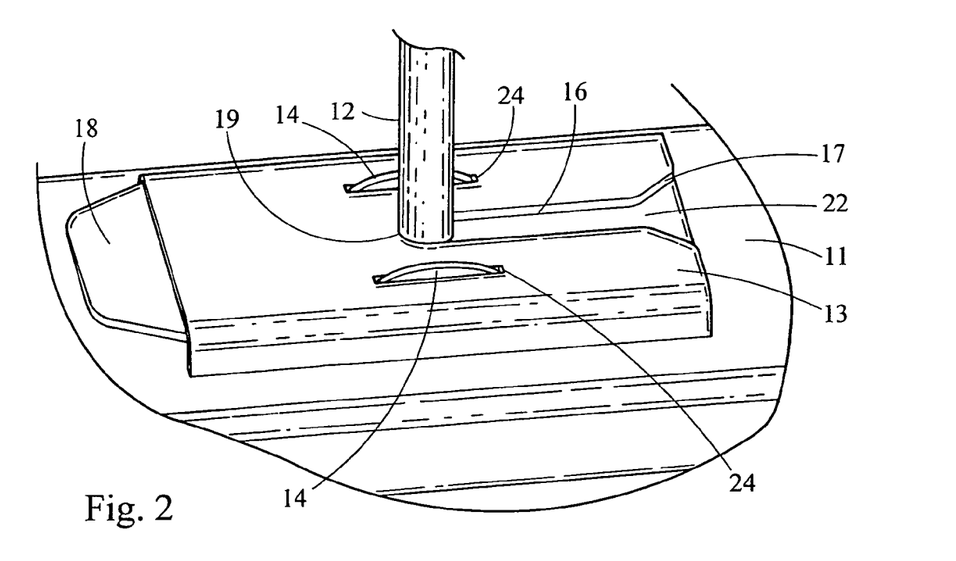
FIG. 2 is a detailed perspective illustration of the locking rib configuration of FIG. 1.

FIG. 2 shows a detailed perspective illustration of the hat section 13 and the locking rib 14 configurations. The hat section 13 includes a guide slot 16. The shaft 12 is inserted in guide slot 16. The guide slot 16 has a tapered end 17 to permit the shaft 12 to be inserted therein. The guide slot 16 also has a closed end 19. The guide slot 16 is an elongated opening 22. The diameter of the elongated opening 22 may vary as desired.

Hat section 13 further includes at least two elongated openings 24. Openings 24 are sufficient to permit ribs 14 to be projected through openings in hat section 13 to center the rack 10 on shaft 12 and lock the rack into position. Plate 18 has at least one rib 14, preferably two ribs. Shaft 12 and plate 18 secure the rack inside the oven through the interface on the rack, hat section 13 and its openings or slots 22, 24.

Figure 3:
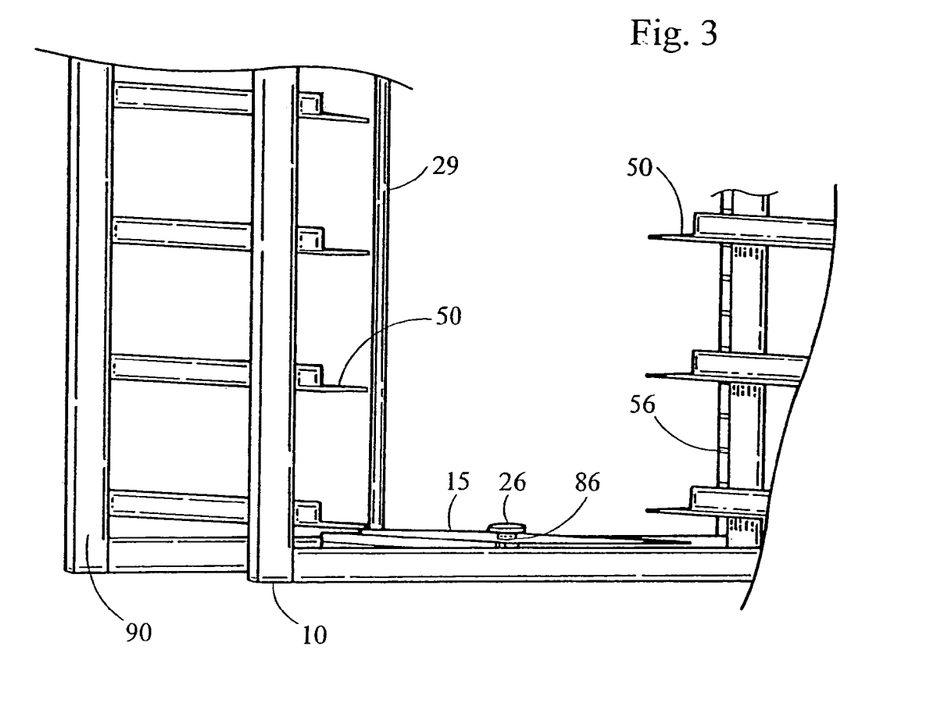
FIG. 3 is a detailed perspective illustration of a bottom portion of the embodiment of FIG. 1.
Figure 7:
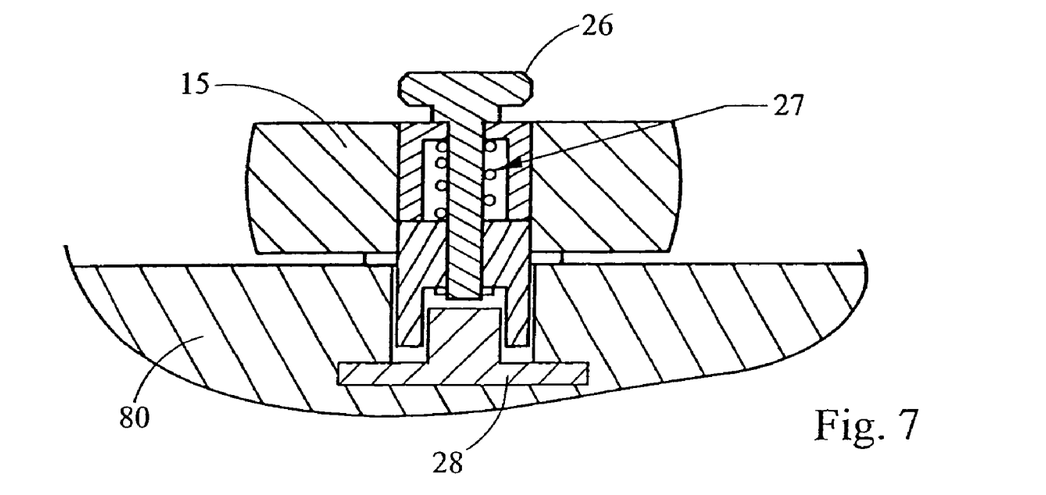
FIG. 7 is a detailed view of a pin and plunger securing an adjustable oven rack to an oven housing.

FIGS. 3 and 7 depict one way of securing rack 10 to oven 100 and oven housing 80 using a fastener 26, such as a plunger. The fastener 26 is inserted in aperture 86 on bottom cross member 15 of the rack 10 to secure the fastener into a pin 28 in the floor of the oven. Aperture 86 provides a second interface to secure rack 10 within the oven where fastener 26 is inserted. The rack fastener 26 permits the bottom of the rack 10 to be centered on a center pin 28 which is secured to the floor of the oven. The diameter of the center pin 28 can vary as desired but should be sufficient to secure the rack 10 within oven 100 and oven housing 80. When the user wants to remove the rack 10 from the oven, the user retracts fastener 26, freeing the fastener from center pin 28, and the user may then raise the rack 10 over the locking ribs 14 and remove the rack from the oven.

The user need only raise the locking ribs 14 approximately about one half inch. Once the rack 10 is disengaged, the rack 10 can slide out of the oven. The user can remove rack 10 from the oven to clean the rack using a commercial washer or other cleaning method not accessible when the rack is housed inside the oven. Additionally, the user can choose not to extract the rack from the oven and use a service technician instead. The service technician can remove the rack to service not only the rack but other oven components within the inside of the oven not normally accessible. This results in a significant time and cost savings reducing the duration of cleaning the rack from approximately one half hour to approximately a few minutes.

Figure 4:
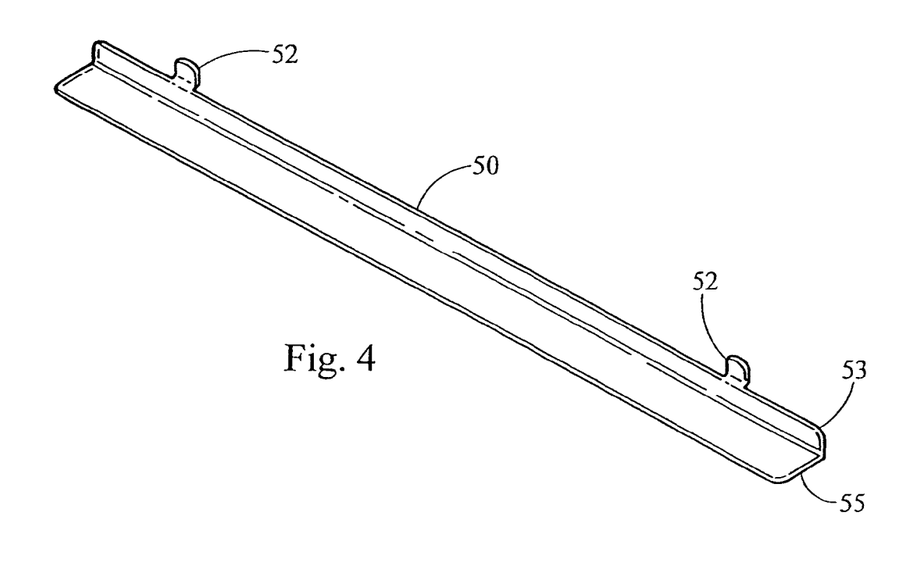
FIG. 4 is a perspective illustration of an elongated pan support member.

FIG. 4 shows an elongated pan support member 50. The elongated pan support member 50 has at least one engaging tab 52. The engaging tabs 52 are extended and offset from the elongated pan support member 50. The pan support member 50 includes vertical portion 53 and a horizontal portion 55. The user can elect to have as many or as few pan support members as desired. The pan support member 50 is not fixed to the rack 10 and may be adjusted as desired by the user. In other embodiments, the tabs may be narrower across their width, and may take the shape almost of a hook, a very narrow tab that will also function to hold the pan support member in place on a rack. Each pan support member is preferably made from a single piece of metal, such as a piece of sheet metal, by blanking, stamping, cutting, press-braking, and other metal-removal and metal-forming processes as desired.

Figure 5A:
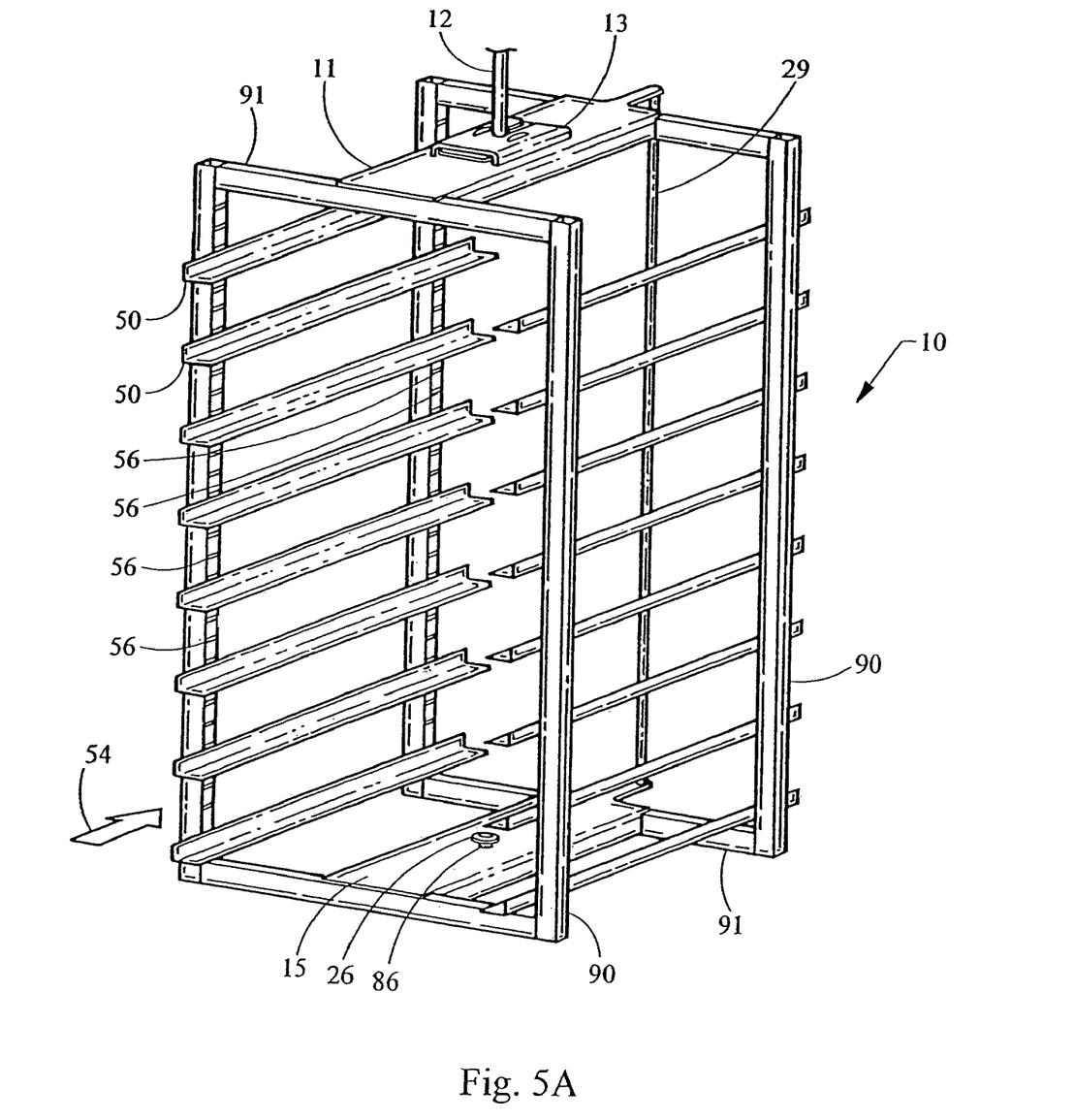
FIG. 5A is a perspective illustration of an oven rack with a plurality of pan supports.

FIG. 5A shows the rack 10 with an adjustable pan support system. Rack 10 is provided with an upper cross member 11 and a lower cross member 15 in order to add rigidity and stability to the pan. Cross members 11, 15 are further preferably stabilized with connecting member 29. Connecting member 29 adds additional rigidity to the rack. Connecting member 29 may be secured to cross members 11, 15 by any convenient method, such as by welding, brazing, or using fasteners. Connecting member 29 also acts as a stop for pans that are slid onto the rack atop the pan support members 50. Pans that are slid into place on rack 10 in the direction of arrow 54 stop when they encounter connecting member 50 because the connecting member prevents further rearward movement of the pan. To remove rack 10 from the oven, such as for periodic cleaning, a user lifts pin 26 to disengage rack 10 from the floor of the oven, and slides the rack forward, opposite to the direction of arrow 54.

The adjustable pan support system includes vertical support members 90 with pan support slots 56, horizontal support members 91, and elongated pan support members 50 on oven rack 10. The vertical and horizontal support members are permanently joined by welding or brazing, or other joining process, or they may be assembled with fasteners, such as rivets or bolts. The adjustable pan supports 50 can be installed by the user and adjusted vertically as desired without a required space increment due to constrictions of functionality. The engaging tab 52 (not shown) can be inserted in the pan support slot 56. The pan support 50 with engaging tab 52 is then rotated approximately about 90 degrees to engage the pan support member 50 into a desired position. The pan support member 50 can be inserted in the bottom of the rack 10 or anywhere in between as desired by the user. The pan support member 50 is inserted horizontally along vertical increments of the rack 10.

Figure 5B:
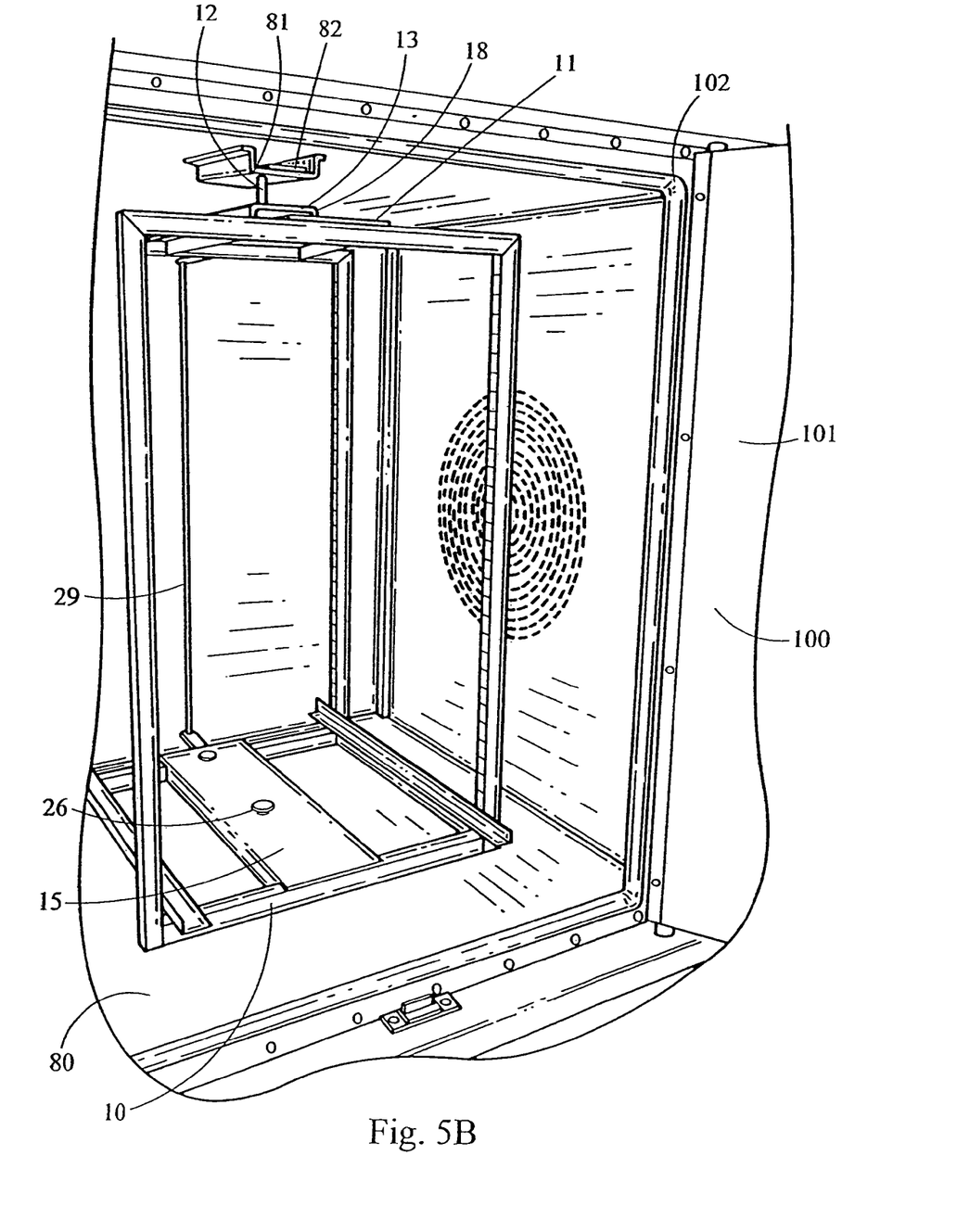
FIG. 5B is perspective illustration of an oven and the adjustable oven rack of FIG. 5A without the pan supports.

FIG. 5B illustrates oven 100 with the removable rack 10 suspended therein. Oven 100 comprises an insulated housing 80, oven door 101 and door seal 102, a shaft 12, a roof support 81, an upper support plate 82 and a lower support plate 18. Rack 10 is suspended within oven 100 by shaft 12, roof support 81 and upper support plate 82. Shaft 12 is attached to housing 80 and lower support plate 18 is attached to shaft 12. Upper support plate 82 may be used to help spread the load of rack 10 over a greater area of roof support 81. As shown in FIG. 1, rack 10 includes a hat section 13 with slots for the shaft and the ribs of plate 18 for securing the rack 10 to plate 18. The rack 10 can now be removed from the housing 80 without the use of tools or special expertise.

Figure 6:
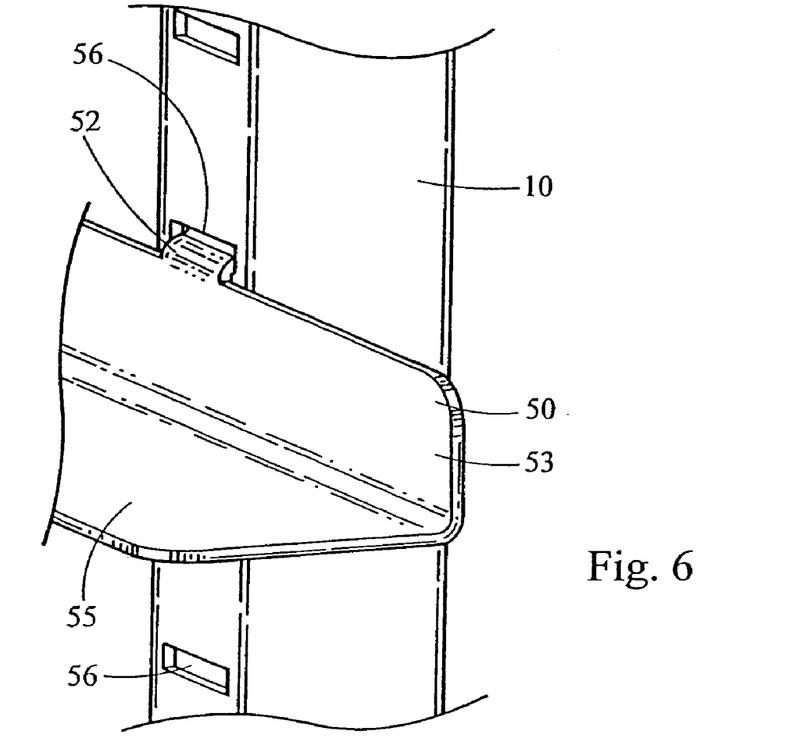
FIG. 6 is a detailed perspective illustration of the pan support and pan support slot configuration shown in FIG. 5A.
Figure 8:
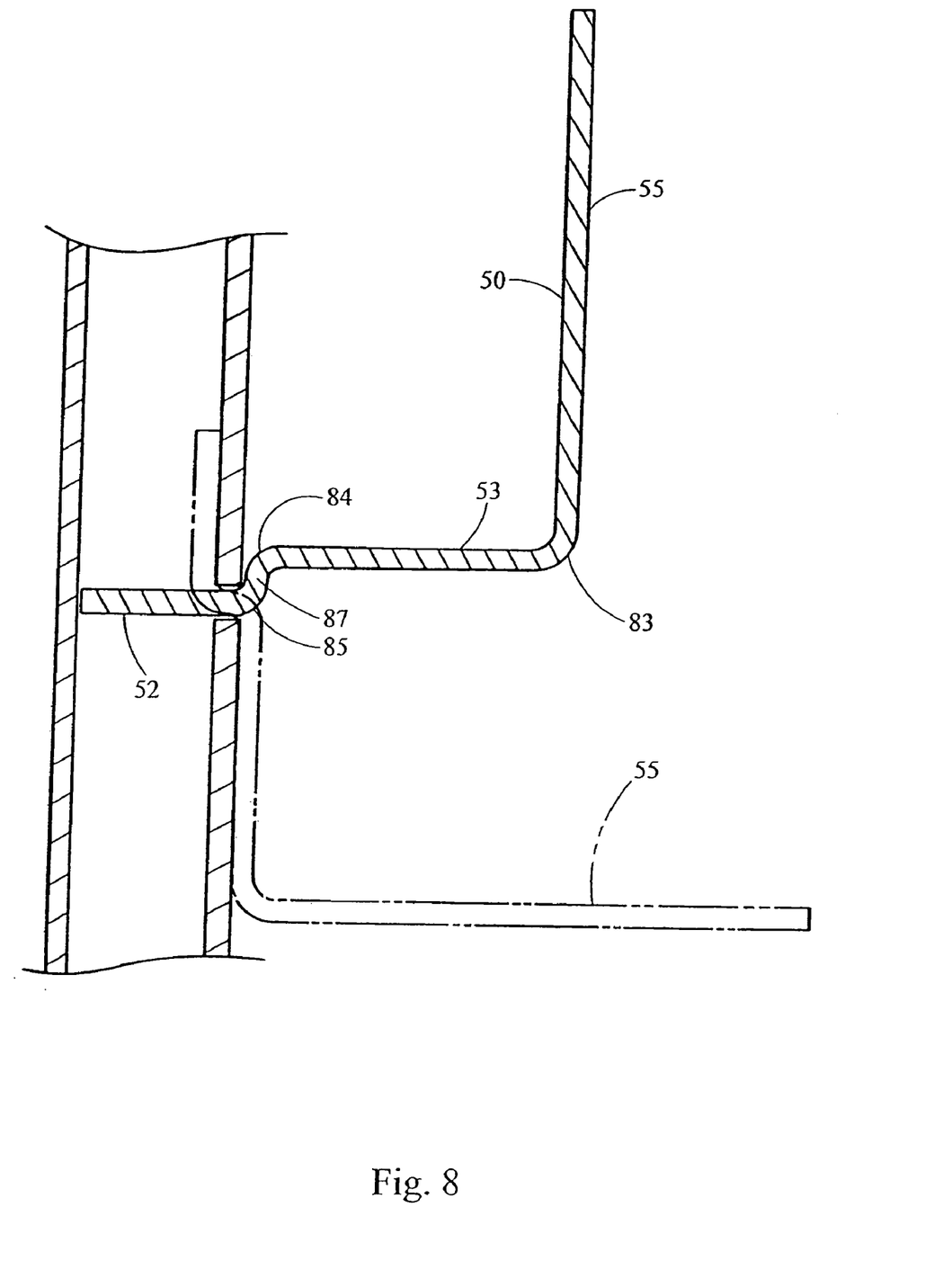
FIG. 8 is a cross-sectional view of a preferred pan support embodiment.

FIG. 6 shows a detailed illustration of the pan support member 50 engaged in the rack support slot 56. The rack support slot 56 permits the engaging tab 52 from being inserted but requires the pan support member 50 to be rotated to disengage from the oven rack 10 slots. FIG. 8 depicts a detailed cross-sectional view of pan support member 50. Pan support member 50 is preferably made of stainless steel or aluminum suitable for food products. The support member 50 includes a horizontal portion 55 and a first angle or bend 83, preferably about 90° and a vertical portion 53.

The pan support is held in place in oven rack 10 by tab 52. Tab 52 is preferably parallel with vertical portion 53, tab 52 formed by making two successive bends 84, 85, each preferably but not required, at 90°, with a very short, almost imperceptible distance 87 between the bends. In other embodiments, tab 52 may be formed by making two successive bends with no distance between the bends. As mentioned above with respect to FIG. 4, each support member 50 is preferably a continuum of metal, i.e., a single piece of metal as formed in a steel mill or aluminum mill as sheet metal, including the vertical portion and the horizontal portion. The support member also preferably includes the tabs as part of the continuum, although the tabs may be added by welding, brazing, or other joining process, including the use of fasteners. The bends in the metal are preferably 90 degrees within manufacturing tolerances of ±3 degrees. Other angles may be used as desired. However, the 90° has worked well in reliably retaining the pan support and pan on the rack, while also allowing for easy removal and re-positioning of the pan supports at a different height in the oven. It is important that the bend portion, 84, 85, 87 works with the remainder of the pan support 50 to maintain the pan support in position, even when the support may be jogged or bumped while holding a pan in place.

It is intended that the foregoing detailed description be regarded as illustrative rather than limiting, and that it be understood that it is the following claims and their equivalents are intended to define the spirit and scope of the invention.

What is claimed is:

1. An oven, comprising:
    an insulated housing;
    a shaft and a top housing interface fixed to an inner top portion of the insulated housing; and
    a rack for holding a plurality of pans for use inside the oven, the rack including a top rack interface for removably securing the rack to the top housing interface, wherein the top housing interface has at least one rib and the top rack interface has at least one slot matching the at least one rib, and wherein the rack is removable without tools from the insulated housing, and
    further comprising a bottom rack interface at a bottom of the rack for removably securing the rack to an inner bottom portion of the insulated housing.

2. The oven of claim 1, wherein the top rack interface is a hat section.

3. The oven of claim 1, wherein the rack further comprises at least one of a top crossmember and a bottom crossmember for at least one of the top and bottom rack interfaces.

4. The oven of claim 1, wherein the top housing interface comprises a plate and the at least one rib is two ribs and the top rack interface comprises a mating plate with a central slot for the shaft and the at least one slot is two slots for the ribs.

5. The oven of claim 1, wherein the rack further comprises a stop for pans placed in the rack.

6. The oven of claim 1, wherein the rack further comprises vertical supports, a plurality of slots within the supports, at least a portion of which slots are vertically aligned, the slots for removable placement of pan supports in the slots, wherein the pan supports are movable without tools from a first vertically aligned position to a second vertically aligned position.

7. A pan support for use with the oven of claim 1, further comprising:
    a horizontal portion of metal;
    a vertical portion of metal forming a continuum with and substantially equal in length to the horizontal portion of metal, the horizontal and vertical portions joined at a substantially 90° angle; and
    at least two supporting tabs extending upward from opposite ends of the vertical portion, each supporting tab comprising a first portion bent at about a 90° angle with respect to the vertical portion, a second portion bent at about a 90° angle with respect to the first portion, and a third portion substantially parallel to the vertical portion.

8. A rack for use in an oven, the rack comprising:
    a plurality of vertical supports;

a plurality of slots within the vertical supports, at least a portion of which slots are vertically aligned, for removable placement of pan supports in the slots;

a plurality of horizontal supports connected to the vertical supports;

a top and a bottom cross-member, the cross-members connected to the horizontal supports, wherein the pan supports are movable without tools from a first vertically aligned position to a second vertically aligned position;

further comprising a top rack interface on the top cross-member and a bottom rack interface on the bottom cross member, the interfaces suitable for removably securing the rack to an oven;

further comprising an oven with an insulated housing having an interior top housing interface and an interior bottom housing interface, wherein the bottom rack interface comprises an aperture and the bottom housing interface comprises a pin and a fastener, and wherein the housing interfaces and the rack interfaces are suitable for removably securing the rack to the oven, and wherein the rack is removable from the oven without tools.

9. The rack of claim 8, wherein the top housing interface comprises a shaft with a plate fixed to a top interior of the housing, and the top rack interface comprises a hat section with a slot.

10. The rack of claim 8, further comprising a stop for pans placed in the rack.

11. A pan support for use with the rack of claim 8, further comprising:

a horizontal portion of metal;

a vertical portion of metal forming a continuum with and substantially equal in length to the horizontal portion of metal, the horizontal and vertical portions joined at a substantially 90° angle; and at least two supporting tabs extending upward from opposite ends of the vertical portion, each supporting tab comprising a first portion bent at about a 90° angle with respect to the vertical portion, a second portion bent at about a 90° angle with respect to the first portion, and a third portion substantially parallel to the vertical portion.

12. The pan support of claim 11, wherein the at least two supporting tabs also form a continuum with the vertical portion of metal.

13. A rack for use in an oven, the rack comprising:

a plurality of vertical supports;

a plurality of slots within the vertical supports, at least a portion of which slots are vertically aligned, for removable placement of pan supports in the slots;

a plurality of horizontal supports connected to the vertical supports;

a top and a bottom cross-member, the cross-members connected to the horizontal supports, wherein the pan supports are movable without tools from a first vertically aligned position to a second vertically aligned position;

further comprising a top rack interface on the top cross-member and a bottom rack interface on the bottom cross member, the interfaces suitable for removably securing the rack to an oven, further comprising an oven with an insulated housing having an interior top housing interface and an interior bottom housing interface, wherein the top housing interface comprises a shaft with a plate fixed to a top interior of the housing with two ribs, and the top rack interface comprises a hat section with two slots for the ribs, and wherein the housing interfaces and the rack interfaces are suitable for removably securing the rack to the oven, and wherein the rack is removable from the oven without tools wherein the plate further comprises two ribs and the top rack interface comprises two slots for the ribs.

* * * * *